United States Patent
Bray et al.

(10) Patent No.: US 10,625,370 B2
(45) Date of Patent: Apr. 21, 2020

(54) ROTARY FRICTION WELDING

(71) Applicant: ROLLS-ROYCE plc, London (GB)

(72) Inventors: Simon E. Bray, Derby (GB); Andrew R. Walpole, Derby (GB)

(73) Assignee: ROLLS-ROYCE PLC, London (GB)

( * ) Notice: Subject to any disclaimer, the term of this patent is extended or adjusted under 35 U.S.C. 154(b) by 314 days.

(21) Appl. No.: 15/654,029

(22) Filed: Jul. 19, 2017

(65) Prior Publication Data

US 2018/0029157 A1    Feb. 1, 2018

(30) Foreign Application Priority Data

Jul. 26, 2016 (GB) .................................. 1612911.6

(51) Int. Cl.
*B23K 20/00* (2006.01)
*B23K 20/12* (2006.01)
(Continued)

(52) U.S. Cl.
CPC ............ *B23K 20/129* (2013.01); *B23K 20/12* (2013.01); *B23K 20/22* (2013.01); *B23K 33/006* (2013.01); *B23P 15/006* (2013.01); *B23P 15/04* (2013.01); *F01D 5/06* (2013.01); *F01D 5/063* (2013.01); *F04D 29/023* (2013.01); *F04D 29/321* (2013.01); *B23K 2101/001* (2018.08); *B23K 2103/18* (2018.08); *F05D 2220/32* (2013.01); *F05D 2230/10* (2013.01); *F05D 2230/239* (2013.01); *F05D 2230/53* (2013.01); *F05D 2300/6032* (2013.01)

(58) Field of Classification Search
CPC . B23K 20/129; B23K 2101/001; B23K 20/12
See application file for complete search history.

(56) References Cited

U.S. PATENT DOCUMENTS

2008/0120842 A1* 5/2008 Wines .................. B23P 15/006
                                              29/889.21
2009/0220820 A1   9/2009 Kolbe et al.
2011/0206523 A1* 8/2011 Konitzer ........... B23K 20/1205
                                              416/213 R

FOREIGN PATENT DOCUMENTS

EP    2168707    3/2010
EP    2343151    7/2011
(Continued)

OTHER PUBLICATIONS

Great Britain Search Report dated Feb. 13, 2017, issued in GB Patent Application No. 1612911.6.
(Continued)

*Primary Examiner* — Erin B Saad
(74) *Attorney, Agent, or Firm* — Oliff PLC

(57) ABSTRACT

The present disclosure provides a rotary friction welding process including: providing an outer axisymmetric workpiece having a front first annular weld surface at a radially inward extent and a rear first annular weld surface at a radially inward extent; providing a front inner axisymmetric workpiece, the front inner workpiece having a front second annular weld surface at a radially outward extent of the front inner workpiece; providing a rear inner axisymmetric workpiece, the rear inner workpiece having a rear second annular weld surface at a radially outward extent of the rear inner workpiece; and rotary welding the workpieces together.

11 Claims, 7 Drawing Sheets

(51) Int. Cl.
*B23K 33/00* (2006.01)
*F01D 5/06* (2006.01)
*F04D 29/32* (2006.01)
*F04D 29/02* (2006.01)
*B23P 15/04* (2006.01)
*B23K 20/22* (2006.01)
*B23P 15/00* (2006.01)
*B23K 101/00* (2006.01)
*B23K 103/18* (2006.01)

(56) References Cited

FOREIGN PATENT DOCUMENTS

| EP | 2359975 | 8/2011 |
| EP | 2987583 | 2/2016 |
| WO | 2014152842 | 9/2014 |

OTHER PUBLICATIONS

European Search Report dated Jan. 30, 2018, issued in EP Patent Application No. 17179912.

* cited by examiner

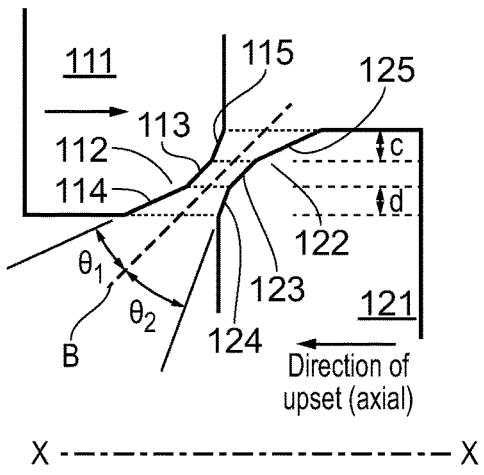
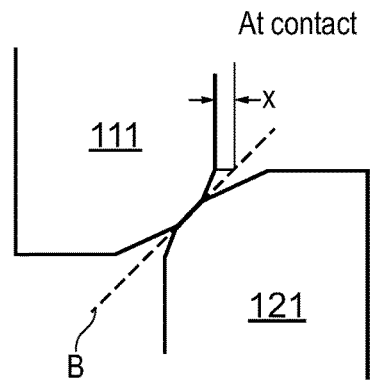
FIG. 4A
FIG. 4B
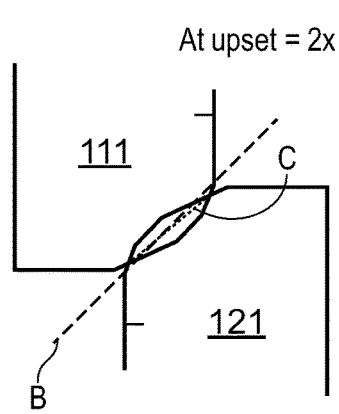
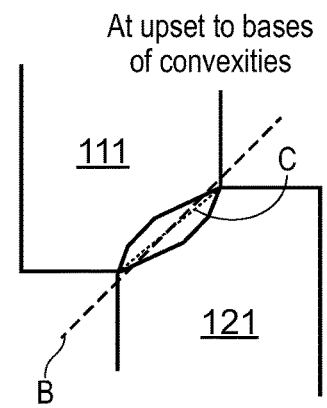
FIG. 4C
FIG. 4D
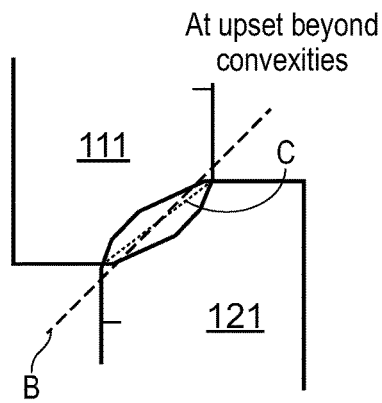
FIG. 4E

ROTARY FRICTION WELDING

CROSS-REFERENCE TO RELATED APPLICATIONS

This specification is based upon and claims the benefit of priority from UK Patent Application Number 1612911.6 filed on 26 Jul. 2016, the entire contents of which are incorporated herein by reference.

BACKGROUND

1. Field of the Disclosure

The present disclosure relates to a rotary friction welding process.

2. Description of the Related Art

Rotary friction welding is a process for welding together two bodies or workpieces by converting mechanical energy to heat energy by the friction between the engaging weld surfaces of the two workpieces. The process involves effecting relative rotation between the two workpieces while the weld surfaces remain in engagement with each other.

For example, in inertia friction welding one of two coaxial workpieces is attached to a flywheel, rotated to a predetermined speed and then driven against the second workpiece using thrust supplied by the welding machine. A fixed amount of stored energy in the flywheel (proportional to $rpm^2 \cdot I$, where rpm is the flywheel's predetermined speed and I is its rotational inertia) is thereby converted to heat by friction at the interface of the engaging weld surfaces, which bonds the workpieces together.

The initial contact between the weld surfaces produces a conditioning period in which friction raises the temperature at the interface. This is followed by upsetting when the temperature reaches a high enough level such that softening of the workpiece material allows the workpieces to be pushed together, with material being expelled sideways from a plasticised zone at the interface as flash.

In its application to turbine hardware, such as the joining of compressor discs, the weld geometry is tubular, i.e. axisymmetric. When using rotary friction to join two discs together to form a welded drum, it is standard practice for the rotating axis of the discs and the direction of applied welding thrust to be parallel, and for the starting weld surfaces of the discs to be flat end faces perpendicular to the rotating axis.

High pressure compressor rear-end assemblies of large civil gas turbine engines may compromise inertia welded rotor discs formed of fine-grain, nickel-based superalloy (such as RR1000).

The inertia weld can be life-limiting for such assemblies due to problems such as:
- Reduced mechanical performance and increased oxidation damage at high operating temperatures when the inertia weld forms a part of the wall of the working gas annulus,
- High residual stresses (hoop and axial) in the weld due to the high creep resistance of the alloy during post-weld heat treatment, which, in combination with high operating stresses, can over-stress the weld zone, and/or
- Recrystallised weld zones with microstructural attributes which promote increased fatigue crack growth rates and reduced low cycle fatigue life.

It would be desirable to provide a rotary friction welding process which mitigates these problems.

SUMMARY

Accordingly in a first aspect, the present disclosure provides rotary friction welding process including:
- providing an outer axisymmetric workpiece for machining into a rim portion of a rotor disc of a multi-stage rotor assembly of a gas turbine engine, the outer workpiece having a front first annular weld surface at a radially inward extent of the outer workpiece and a rear first annular weld surface at a radially inward extent of the outer workpiece;
- providing a front inner axisymmetric workpiece for machining into a front diaphragm of the rotor disc, the front inner workpiece having a front second annular weld surface at a radially outward extent of the front inner workpiece;
- providing a rear inner axisymmetric workpiece for machining into a rear diaphragm of the rotor disc, the rear inner workpiece having a rear second annular weld surface at a radially outward extent of the rear inner workpiece;
- aligning the outer workpiece and the front inner workpiece on a common axis with the front first and second weld surfaces facing each other, rotating one of the outer and front inner workpieces about the axis relative to the other aligned workpiece, engaging the aligned workpieces at the front first and second weld surfaces such that the rotation raises the temperature at the front weld surfaces to create a front weld interface, and ceasing the rotation and allowing the front weld interface to cool to weld the outer and the front inner workpieces together at the front interface; and
- aligning the outer workpiece and the rear inner workpiece on the common axis with the rear first and second weld surfaces facing each other, rotating one of the outer and rear inner workpieces about the axis relative to the other aligned workpiece, engaging the aligned workpieces at the rear first and second weld surfaces such that the rotation raises the temperature at the rear weld surfaces to create a rear weld interface, and ceasing the rotation and allowing the rear weld interface to cool to weld the outer and the rear inner workpieces together at the rear interface;

wherein:
on a longitudinal section through the aligned workpieces, the front first and second annular weld surfaces are inclined from the radial direction and are substantially parallel to each other such that the cooled front weld interface is correspondingly inclined from the radial direction, and the rear first and second annular weld surfaces are inclined from the radial direction and are substantially parallel to each other such that the cooled rear weld interface is correspondingly inclined from the radial direction.

The front weld can be formed before the rear weld, or vice versa. Thus in the subsequent procedure to form the second weld, the outer workpiece will already be attached to the first-welded inner workpiece. Alternatively, both welds can be formed simultaneously.

Advantageously, by adopting the above process a multi-stage rotor assembly can be formed in which the weld interfaces are at the radially inner side of the rim portion. They are thus distant from the wall of the working gas annulus, which reduces the temperatures to which the welds are exposed. This position also allows the welds to experience lower service stresses. Both these factors thus help to mitigate the problems listed above. As a consequence, the service life of the assembly can be increased, inspection intervals increased, and overall costs reduced.

The rotary friction welding process may have any one or any combination of the following optional features.

The process may be an inertia, direct drive, or hybrid rotary friction welding process.

The outer workpiece may have a further first annular weld surface at a radially inward extent thereof. The process can then further include:

providing a further inner axisymmetric workpiece for machining into a further diaphragm of the rotor disc, the further inner workpiece having a further second annular weld surface at a radially outward extent of the further inner workpiece; and aligning the outer workpiece and the further inner workpiece on a common axis with the further first and second weld surfaces facing each other, rotating one of the outer and further inner workpieces about the axis relative to the other aligned workpiece, engaging the aligned workpieces at the further first and second weld surfaces such that the rotation raises the temperature at the further weld surfaces to create a further weld interface, and ceasing the rotation and allowing the further weld interface to cool to weld the outer and the further inner workpieces together at the further interface;

wherein:

on the longitudinal section through the aligned workpieces, the further first and second annular weld surfaces are inclined from the radial direction and are substantially parallel to each other such that the cooled further weld interface is correspondingly inclined from the radial direction.

Indeed, the process can be repeated in this way for any number of further inner workpieces in order to form further diaphragms. The first annular weld surfaces of the outer workpiece may be radially staggered.

The process may include performing an intermediate post-weld heat treatment after the formation of one weld and before the formation of the next weld. The process may include a performing a final post-weld heat treatment after the formation of all the welds.

The weld surfaces may be formed by machining the respective workpiece or by build-up of a suitable material by a material addition process.

The outer workpiece may be formed of a different material, e.g. a different alloy or the same alloy but a different microstructure, to that of any one or more of the inner workpieces. For example, the rim microstructure may be relatively coarse grained, while the diaphragms may be relatively fine grained.

On the longitudinal section, the first and second weld surfaces of each pair of first and second weld surfaces may be inclined by at least 25° or 35° and/or by at most 65° or 55° from the radial direction. Conveniently, they may be inclined by about 45° from the radial direction.

The first and second weld surfaces can be flat surfaces. Another option, however, is for the weld surfaces to be lightly curved or facetted.

Optionally, on the longitudinal section through the aligned workpieces, each weld surface of each pair of first and second weld surfaces may be flanked by radially inner and outer side surfaces which are angled from their respective weld surface, the first weld surface and its side surfaces being shaped to thermally match the second weld surface and its side surfaces across a line of initial contact of the first and second weld surfaces such the heat flows from the weld at all the side surfaces are substantially equal. In this way, a similar heat-sink effect can be produced in each workpiece. This in turn allows the outward flow of expelled material from the weld to be controlled, reducing flow bias and helping to control rotation of the weld interface. In particular, on the longitudinal section through the aligned workpieces, the first weld surface and its side surfaces may mirror the second weld surface and its side surfaces across the line of initial contact of the first and second weld surfaces. This arrangement can provide good thermal matching particularly when the materials of the first and second workpieces are the same or have similar thermal properties, and/or when the first and second annular weld surfaces are inclined by 45° from the radial direction. The thermal matching across the line of initial contact typically involves using the specific heat capacity and/or thermal conductivity of each of the first and second workpieces to determine appropriate shapes for the weld surfaces and their side surfaces such that the heat flows from the weld are substantially equal.

One of each pair of first and second annular weld surfaces may be an apex region of a convexity which is consumed as the respective workpieces are engaged, on the longitudinal section through the aligned workpieces the convexity having a profile in which radially inner and outer side surfaces of the convexity taper towards the apex region such that, on the longitudinal section, the respective weld interface increases in length as the convexity is consumed. Advantageously, by providing a convexity with such a profile, a largely symmetrical heat-sink effect can be produced. This in turn allows the outward flow of expelled material from the weld to be controlled, reducing flow bias and helping to control rotation of the weld interface. In addition, variability in the initial contact conditions at the weld surfaces can be reduced, leading to a more predictable conditioning period. More particularly, local hotspots can be reduced or eliminated and less time may be required to form a plasticised interface zone. In addition, the sideways distance for defects to be rejected into flash can be reduced, and detrimental effects of workpiece diameter mismatch, eccentricity and lack of coaxiality can be reduced or eliminated. Further, an increased pressure during contact can be achieved, thereby promoting an initial rapid expulsion of interface contaminants and improving sealing of the weld against re-introduction of contaminants. The convexity may be a projection from the respective workpiece.

On the longitudinal section, the side surfaces may be angled by at least 5°, 10° or 20° from the respective weld surface and/or at most 80°, 70° or 60° from the respective weld surface. If the angle is too low, then the increased contact area during welding can exceed machine capacity and/or reduce the efficiency with which interface contaminants are expelled. In contrast, if the angle is too high, a lack of sideways restraint under upsetting load can force the parts of the workpieces adjacent the weld interface radially inwardly or outwardly. For each weld surface, the angle between one of its side surfaces and the weld surface may be greater than the corresponding angle between the other of its side surfaces and the weld surface, for example it may be greater by at least 10°, 20° or 40°. Alternatively, for each weld surface, the angle between one of its side surfaces and the weld surface may be the same as the corresponding angle between the other of its side surfaces and the weld surface.

When one of each pair of first and second annular weld surfaces is an apex region of a convexity, then the other of the first and second annular weld surfaces of each pair of first and second annular weld surfaces may be a further apex region of a further convexity, on the longitudinal section the further convexity having a profile in which radially inner and outer side surfaces of the further convexity taper towards the further apex region such that, on the longitudinal section, the weld interface increases in length as the further convexity is consumed. Optional features of the first convexity can apply to the further convexity. The shapes of the convexities of each pair of first and second annular weld surfaces may be the same such that, on the longitudinal section through the aligned workpieces, the convexities are related to each other by a 2-fold axis of rotational symmetry about a point located on a line midway between their facing weld surfaces. Particularly when the inner and outer workpieces are formed of dissimilar materials, the shapes of their respective convexities can be adjusted accordingly. For example, a workpiece formed of softer material than the other workpiece may have larger side surface angles. In this way, due to the higher rate of upset of the softer workpiece, a better weld interface shape and position can be maintained.

In a second aspect, the present disclosure provides a method of forming a rotor disc of a multi-stage rotor assembly of a gas turbine engine, method including:

performing the process of the first aspect;
machining the outer workpiece into a rim portion of the rotor disc; and
machining each inner workpiece into a respective diaphragm of the rotor disc.

The machining of the outer workpiece may include machining two or more circumferential rows of slots into the rim portion for receiving respective aerofoil bodies.

In a third aspect, the present disclosure provides a method of forming a multi-stage blisk assembly of a gas turbine engine, method including:

performing the process of the first aspect;
machining the outer workpiece into a rim portion of a rotor disc of the assembly and into two or more circumferential rows of aerofoil bodies extending from the rim portion; and
machining each inner workpiece into a respective diaphragm of the rotor disc.

Compared to a conventionally bladed assembly, the blisk assembly can help to reduce operating stresses and reduce specific fuel consumption by reducing the weight of the assembly. Instead of machining the outer workpiece into two or more circumferential rows of aerofoil bodies, these bodies can be attached to the rim portion by linear friction welding.

In the second or third aspect, the outer workpiece and/or the inner workpieces may include sacrificial material adjacent the weld surfaces to stiffen the workpieces and/or to facilitate the application of forge loads during engagement of the aligned workpieces in the rotary friction welding process. The method may then further include: machining away the sacrificial material.

Further aspects of the present disclosure provide a rotor disc formed by the method of the second aspect and a blisk assembly formed by the method of the third aspect. For example, such a rotor disc or blisk assembly may have a rim portion and front and rear diaphragms, each diaphragm extending radially inwards from the rim portion and joining to the rim portion at a respective weld having a weld interface which is inclined from the radial direction. The rotor disc may further have two or more circumferential rows of slots formed in the rim portion for receiving respective aerofoil bodies.

BRIEF DESCRIPTION OF THE DRAWINGS

Embodiments of the disclosure will now be described by way of example with reference to the accompanying drawings in which:

FIG. 4A shows schematically, in respect of a first variant of the welding process, a longitudinal cross-section through a close-up at the weld surfaces of workpieces in readiness to undergo rotary friction welding;

FIG. 4B shows schematically, in respect of the first variant of the welding process, a longitudinal cross-section through a close-up at the weld surfaces of workpieces at contact of the weld surfaces after upset through an axial distance x;

FIG. 4C shows schematically, in respect of the first variant of the welding process, a longitudinal cross-section through a close-up at the weld surfaces of workpieces after upset through an axial distance 2x;

FIG. 4D shows schematically, in respect of the first variant of the welding process, a longitudinal cross-section through a close-up at the weld surfaces of workpieces after further upset to the bases of convexities forming the weld surfaces;

FIG. 4E shows schematically, in respect of the first variant of the welding process, a longitudinal cross-section through a close-up at the weld surfaces of workpieces after further upset beyond the convexities;

DETAILED DESCRIPTION OF THE DISCLOSURE

Figure 1:
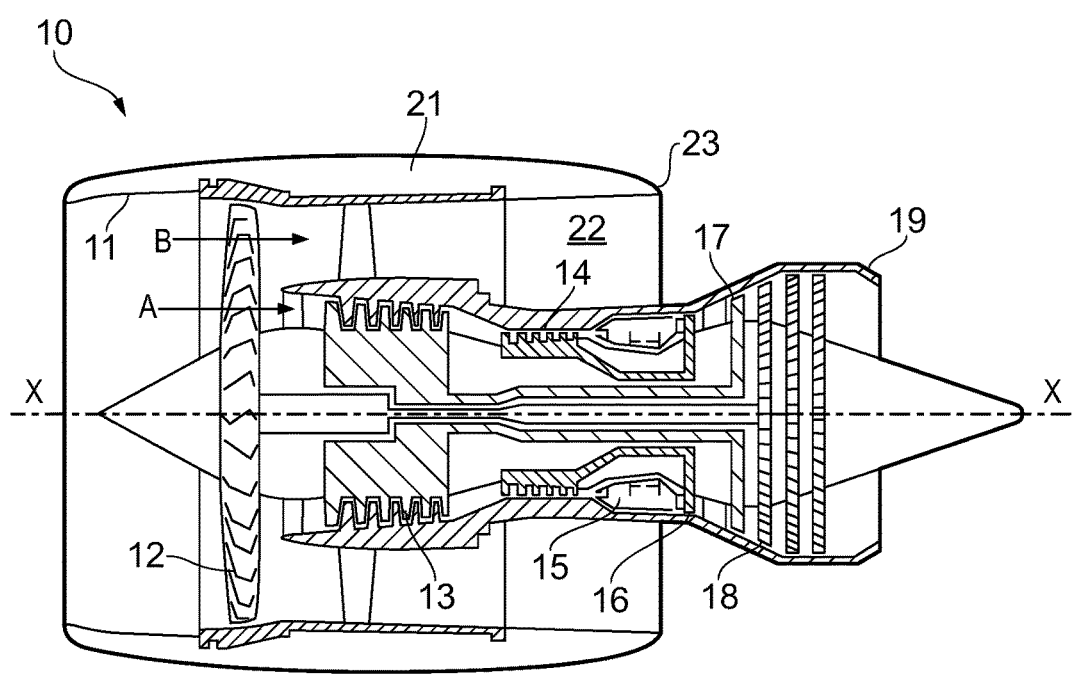
FIG. 1 shows a longitudinal cross-section through a ducted fan gas turbine engine.

With reference to FIG. 1, a ducted fan gas turbine engine incorporating the disclosure is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate-pressure compressor 13 and a second air flow B which passes through the bypass duct 22 to provide propulsive thrust. The intermediate-pressure compressor 13 compresses the air flow A directed into it before delivering that air to the high-pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate-pressure compressors 14, 13 and the fan 12 by suitable interconnecting shafts.

Figure 2:
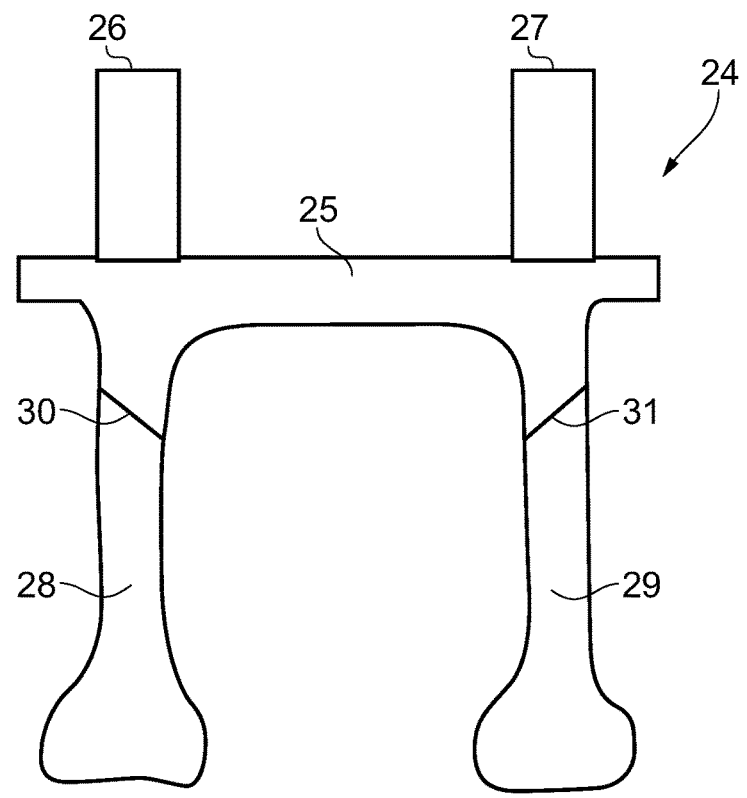
FIG. 2 shows schematically a longitudinal cross-section of a high-pressure compressor blisk assembly.

The high-pressure compressor 14 has a number of stages comprising respective circumferential rows of compressor blades. The last two stages are formed as a blisk assembly 24 shown schematically in the longitudinal cross-section of FIG. 2. The assembly has a rim portion 25 from which front 26 and rear 27 rows of blades extend radially outwardly and front 28 and rear 29 diaphragms extend radially inwardly. The diaphragms join to the rim portion at respective welds 30, 31 having weld interfaces which are inclined from the radial direction. Advantageously, the welds are away from the outer side of the rim portion, and thus distant the working gas annulus. This reduces the temperatures to which the welds are exposed, and also exposes the welds to lower service stresses, thereby increasing the service life of the assembly.

The blisk assembly 24 is formed by a rotary friction welding process, described with reference to FIG. 3, which shows schematically an outer axisymmetric workpiece 32 for machining into the rim portion 25 and blade rows 26, 27 of the assembly, a front inner axisymmetric workpiece 33 for machining into the front diaphragm 28, and rear inner axisymmetric workpiece 34 for machining into the rear diaphragm 29. The shape of the final assembly is indicated in dashed lines.

The rotary friction welding process proceeds by aligning the outer workpiece 32 and the front inner workpiece 33 on the axis X-X. The outer workpiece has a front first annular weld surface 35 at a radially inward extent, and the front inner workpiece 33 has a front second annular weld surface 36 at a radially outward extent, the weld surfaces both being inclined from the radial direction and being substantially parallel to each other. The workpieces are aligned such that the weld surfaces face each other. One of the workpieces is rotated about the axis X-X relative to the other workpiece. The two workpieces are then engaged by upsetting through an axial distance so that the weld surfaces make contact, and an inclined weld interface is produced. On ceasing rotation, the weld interface cools to join the workpieces together.

A similar process is then repeated to join the outer workpiece 32 and the rear inner workpiece 34, the outer workpiece having an inclined rear first annular weld surface 37 at a radially inward extent and the rear inner workpiece 34 having an inclined rear second annular weld surface 38 at a radially outward extent.

After the first weld 30 is complete, the weld face may be cleaned-up to remove flash and provide a uniform, flat surface for application of the forge load for the second weld 31.

An intermediate post-weld heat treatment (PWHT) may be performed on the joined workpieces 32, 33 prior to the formation of the second weld 31.

After the second weld 31 is complete, the joined workpieces 32-34 can be post-weld heat treated to a schedule suitable to maintain the properties of the workpieces and facilitate an adequate level of stress relief of the two welds 30, 31.

Figure 3:
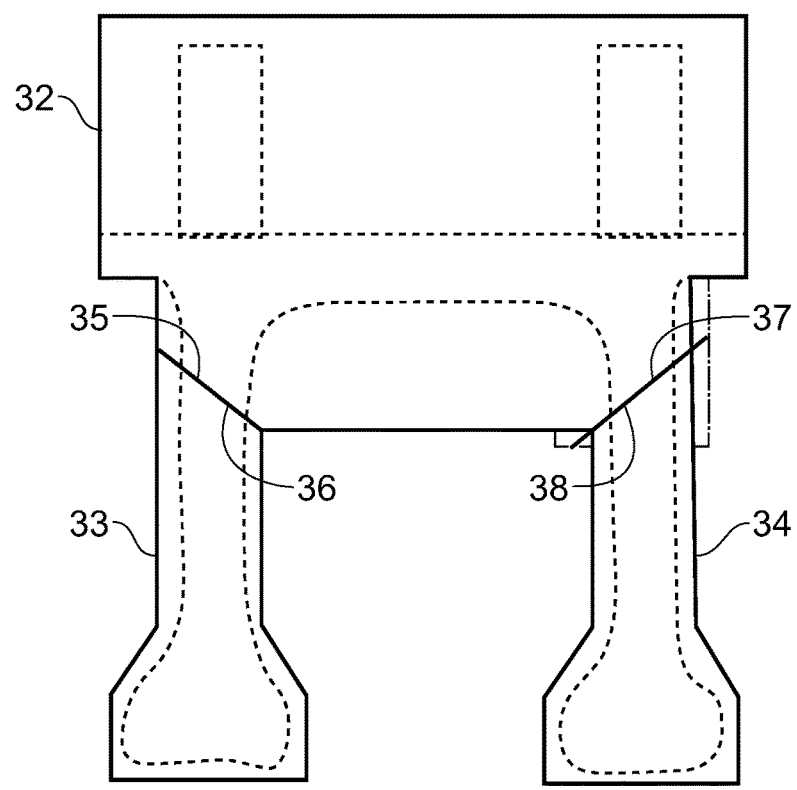
FIG. 3 shows schematically aligned workpieces for use in a welding process and subsequent machining into a rim portion, blade rows, front diaphragm and rear diaphragm of the assembly of FIG. 2.

The workpieces 32-34 include substantial amounts of sacrificial material (indicated in FIG. 3 between the solid outer lines and the dashed inner lines). This sacrificial material is machined away after the welding process. In particular, the sacrificial material adjacent the weld surfaces 35-38 helps to stiffen the workpieces and facilitates the application of forge loads during engagement of the aligned workpieces. Additional sacrificial material (indicated in FIG. 3 between the dash-dotted lines and the solid lines) may be provided on the adjacent the second weld to be formed (i.e. adjacent weld surfaces 37, 38) in order to further facilitate the application of the forge load.

Material is also machined away from the outer side of the outer workpiece 32 to form the blade rows 26, 27. Another option, however, is to attach the blades by linear friction welding, in which case the outer workpiece can have a reduced radial thickness. Indeed, rather than forming a blisk, the blades can be conventionally mounted to dovetail slots machined in the rim portion.

Advantageously, the outer workpiece 32 can be formed as a single piece e.g. by ring-rolling, and can be heat treated to provide an optimal microstructure (such as a coarse grain RR1000 microstructure) for the rim portion 25 and blades. The inner workpieces 33, 34, by contrast, can be formed of a different material (such as fine grained RR1000 or a suitable lower-cost alloy such as IN718). Thus, more generally, each workpiece may be manufactured to optimise material utilisation, such as near net shape forging or profiled ring-rolling, and each workpiece can have its own unique alloy or heat treatment.

The process can be extended to form rotor discs or blisks for three or more stages, i.e. with three or more diaphragms, each joined under the rim portion. In this case, the welds may be radially staggered so that the weld forge load can be applied along the axial line-of-sight.

The process is compatible with forming the rim portion out of relatively exotic material, such as metal matrix composite (MMC) for further weight and material reduction. In particular, the MMC reinforcement can be localised into just key areas of the rim portion.

A PWHT may be applied globally to the completed assembly, or in intermediate stages as workpieces are joined. The latter may be particularly suitable when the material for each diaphragm is different and requires a specific PWHT schedule (time and temperature) to balance the disc and weld properties. Another option is for a given PWHT to be applied locally to each weld.

The manufacturing sequence may be varied as appropriate, i.e. order of welding, detailed machining steps, PWHT steps.

The inclined weld interfaces can produce a biased outflow of expelled material from the interfacial plasticised zone, leading to substantial rotation of the weld interface. The biased outflow can prevent effective cleaning of the interface, and thus can negatively impact on weld integrity. To counter this, for any given weld, either (or indeed both) of the respective annular weld surfaces may be formed as an apex region of a convexity which is consumed as the workpieces are engaged, on the longitudinal section through the aligned workpieces the convexity having a profile in which radially inner and outer side surfaces of the convexity taper towards the apex region such that, on the longitudinal section, the weld interface increases in length as the convexity is consumed. With such a configuration, it is possible to produce a largely symmetrical heat-sink effect in the workpieces, which allows the outward flow of expelled material from the weld to be controlled, reducing flow bias and helping to control rotation of the weld interface.

FIG. 4 shows schematically longitudinal cross-sections through a close-up at the weld surfaces of two workpieces to illustrate stages (A)-(E) in a first variant of the rotary friction welding process that can be used to form the assembly 24.

As shown in FIG. 4(A) the outer workpiece 111 has a first convexity 112 at a radially inward extent of the workpiece. The apex region of the convexity 112 forms a first annular weld surface 113, with radially inner 114 and outer 115 side surfaces of the convexity 112 tapering towards the apex region. The side surface 114 is angled by an angle $\theta_1$ from the first weld surface 113 and the side surface 115 is angled by an angle $\theta_2$ from the first weld surface 113.

Similarly, the inner workpiece 121 has a second convexity 122 at a radially outward extent of the workpiece. The apex region of the convexity 122 forms a second annular weld surface 123, with radially inner 124 and outer 125 side surfaces of the convexity 122 tapering towards the apex region. The side surface 124 is angled by an angle $\theta_2$ from the second weld surface 123 and the side surface 125 is angled by an angle $\theta_1$ from the second weld surface 123.

The convexities 112, 122 can be formed by machining the respective workpiece 111, 121 or by build-up of a suitable material by a material addition process.

The workpieces 111, 121 are aligned on axis X-X with the weld surfaces 113, 123 facing each other. On the longitudinal cross-section, the weld surfaces 113, 123 are both inclined by about 45° from the radial direction. The weld surfaces are flat (or lightly curved or facetted), and are substantially parallel to each other. Inclined surface B midway between the weld surfaces 113, 123 is thus also parallel to both weld surfaces.

The workpieces are configured so that: (i) $\theta_1=\theta_2$, (ii) the radial extents of the side surfaces 114, 115, 124, 125 are all equal (i.e. distance c=distance d), and (iii) the radial extents of the weld surfaces 113, 123 are equal. On the longitudinal cross-section of FIG. 4(a), the convexities 112, 122 are related to each other by a 2-fold axis of rotational symmetry about a point located on the trace of surface B. Such an arrangement with $\theta_1=\theta_2$ may be preferred, for example, in the case of a weld having a small ratio of outer diameter to inner diameter so that weld conditions are similar on both sides of the weld interface.

One of the workpieces 111, 121 is rotated about the axis X-X relative to the other workpiece. The two workpieces are then engaged by upsetting through an axial distance x so that the weld surfaces 113, 123 make contact, as shown in FIG. 4(b), and a weld interface is produced which is, initially at least, along the inclined surface B.

As shown in FIG. 4(c), after upsetting through an axial distance 2x, significant amounts of the convexities 112, 122 are consumed and the weld interface C rotates slightly or becomes slightly "S"-shaped relative to surface B. The weld interface C also increases in length on the longitudinal section as the convexities 112, 122 are consumed. The tapered convexities 112, 122 help to produce a largely symmetrical heat sink to either side of the weld interface C, which reduces bias in the outward flow of expelled material from the weld. In addition, the convexities 112, 122 initially produce localised high pressures and temperatures at the weld interface C, which help to reduce the weld conditioning period.

Referring to FIGS. 4(D) and (E), as the upsetting progresses, the convexities 112, 122 are completely consumed, and there is further slight rotation of the weld interface C, which nonetheless remains inclined from the radial direction.

FIG. 5 shows schematically longitudinal cross-sections through a close-up at the weld surfaces of the workpieces 111, 121 to illustrate stages (A)-(D) in a second variant of the rotary friction welding process. Features in FIG. 5 corresponding to those in FIG. 4 have the same reference numbers.

The process is similar to that of the first variant except that the convexities 112, 122 are now in the form of projections from the workpieces 111, 121. This change in form of the convexities is brought about by substantially increasing the angle $\theta_1$ by which side surface 115 is angled from the first weld surface 113, and the corresponding angle $\theta_1$ by which side surface 124 is angled from the second weld surface 123. Angles $\theta_2$ for the other side surfaces 114, 125 are unchanged. On the longitudinal cross-section of FIG. 5(A), the convexities 112, 122 are still related to each other by a 2-fold axis of rotational symmetry located on the trace of surface B.

Figure 5A:
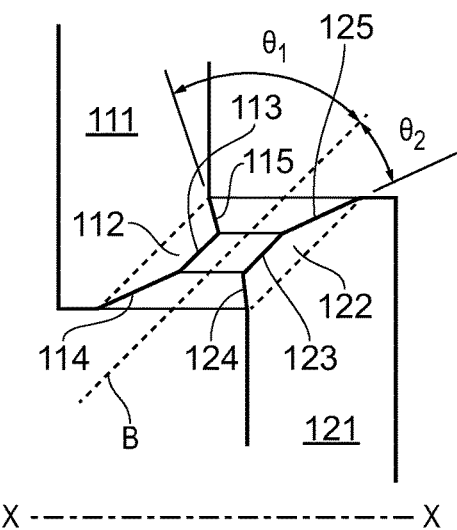
FIG. 5A shows schematically, in respect of a second variant of the welding process, a longitudinal cross-section through a close-up at the weld surfaces of the workpieces in readiness to undergo rotary friction welding.
Figure 5B:
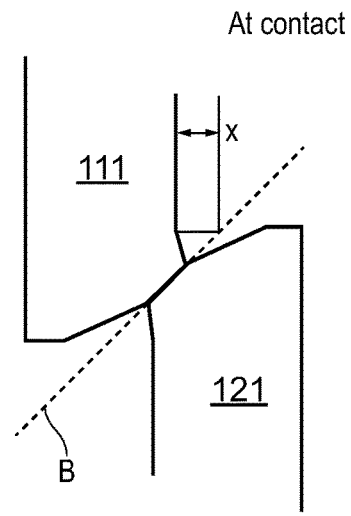
FIG. 5B shows schematically, in respect of the second variant of the welding process, a longitudinal cross-section through a close-up at the weld surfaces of the workpieces at contact of the weld surfaces after upset through an axial distance x.
Figure 5C:
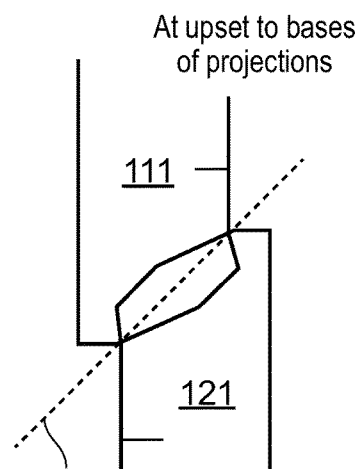
FIG. 5C shows schematically, in respect of the second variant of the welding process, a longitudinal cross-section through a close-up at the weld surfaces of the workpieces after upset to the bases of projections forming the weld surfaces.
Figure 5D:
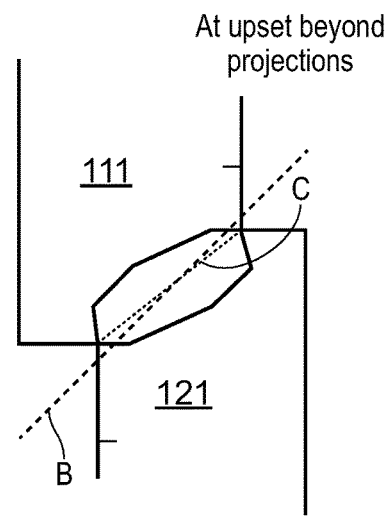
FIG. 5D shows schematically, in respect of the second variant of the welding process, a longitudinal cross-section through a close-up at the weld surfaces of the workpieces after further upset beyond the projections.

The asymmetric angles $\theta_1$, $\theta_2$ produce an asymmetric heat sink in the respective workpieces 111, 121 which allows the weld interface C to remain substantially unrotated, i.e. parallel to surface B, during the consumption of the projections 112, 122. With reference to FIG. 5(D), as upsetting continues past the bases of the projections 112, 122, however, the weld interface C may slightly rotate or become slightly "S"-shaped.

The asymmetric volumes at the bases of the projections 112, 122 can influence local softening and therefore efficiency of flash flow and expulsion of contaminants in the latter stages of the consumption of the projections. This issue can be addressed in a third variant of the rotary friction welding process. FIG. 6 shows schematically longitudinal cross-sections through a close-up at the weld surfaces of the workpieces 111, 121 to illustrate stages (A)-(E) in the third variant. Features in FIG. 6 corresponding to those in FIGS. 4 and 5 have the same reference numbers.

In the third variant, the workpieces 111, 121 are adjusted so that the internal workpiece angles $\theta_3$, $\theta_4$, $\theta_5$, $\theta_6$ between the side surfaces 114, 115, 124, 125 and the workpiece surfaces neighbouring the projections are all the same, i.e. $\theta_3=\theta_4=\theta_5=\theta_6$. In contrast, in FIG. 5(A), the corresponding angles to $\theta_3$ and $\theta_5$ are significantly less than the corresponding angles to $\theta_4$ and $\theta_6$. The adjustment can be achieved by providing additional workpiece surfaces 116, 126 adjacent to side surfaces 115, 125. On the longitudinal cross-section of FIG. 6($a$), the convexities 112, 122 are still related to each other by a 2-fold axis of rotational symmetry located on the trace of surface B.

Figure 6A:
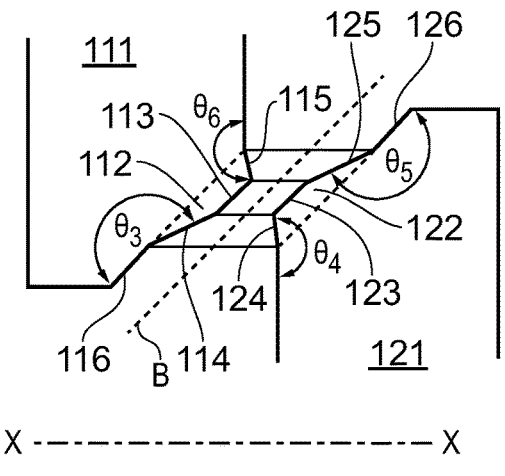
FIG. 6A shows schematically, in respect of a third variant of the welding process, a longitudinal cross-section through a close-up at the weld surfaces of the workpieces in readiness to undergo rotary friction welding.
Figure 6B:
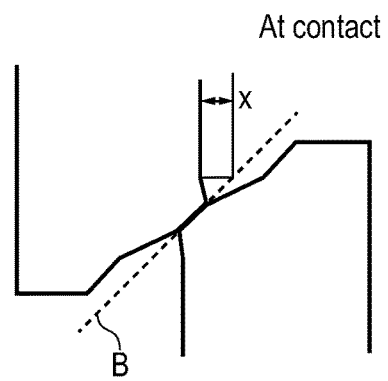
FIG. 6B shows schematically, in respect of the third variant of the welding process, a longitudinal cross-section through a close-up at the weld surfaces of the workpieces at contact of the weld surfaces after upset through an axial distance x.
Figure 6C:
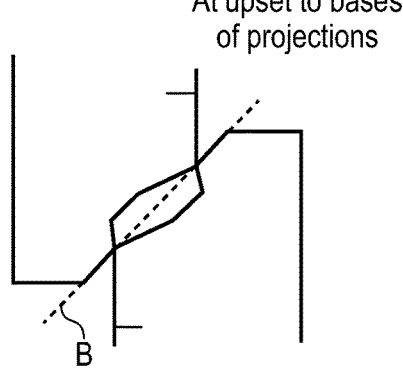
FIG. 6C shows schematically, in respect of the third variant of the welding process, a longitudinal cross-section through a close-up at the weld surfaces of the workpieces after further upset to the bases of projections forming the weld surfaces.
Figure 6D:
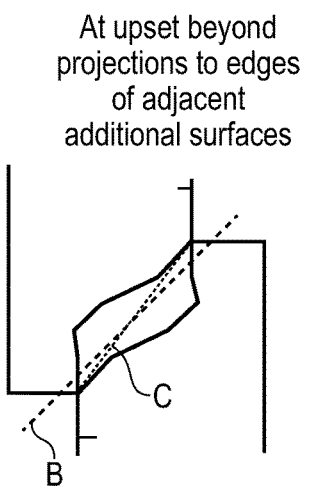
FIG. 6D shows schematically, in respect of the third variant of the welding process, a longitudinal cross-section through a close-up at the weld surfaces of the workpieces after further upset to the edges of adjacent additional surfaces.
Figure 6E:
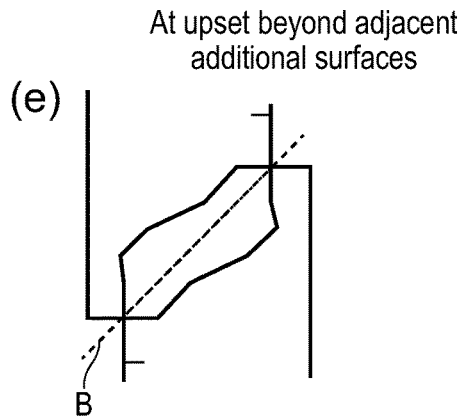
FIG. 6E shows schematically, in respect of the third variant of the welding process, a longitudinal cross-section through a close-up at the weld surfaces of the workpieces after further upset beyond the adjacent additional surfaces.

The adjustment that produces $\theta_3=\theta_4=\theta_5=\theta_6$ helps to promote an equal heat flow at all sides of the weld interface as the upset reaches the base of the projections (FIG. 6(C)). In this way, flash flow and expulsion of contaminants in the latter stages of the consumption of the projections can still be balanced to both sides of the weld.

In the case of a weld having a large ratio of outer diameter to inner diameter, the difference in relative velocity of the workpieces between the outer and inner diameters can prompt an adjustment of the angles such that $\theta_3=\theta_4 \neq \theta_5=\theta_6$ (with $\theta_3$ and $\theta_4$ typically being greater than $\theta_5$ and $\theta_6$) in order to ensure unbiased expulsion. Similarly, $\theta_4$ and $\theta_5$ can be adjusted relative to $\theta_3$ and $\theta_6$ to account for differences in material thermal and mechanical properties when welding dissimilar materials.

In general, to control weld interface rotation, the welding process can be stopped at or shortly after complete consumption of the convexities, i.e. at stage (D) in FIG. 4, stage (C) in FIG. 5 and stage (C) in FIG. 6.

Figure 7:
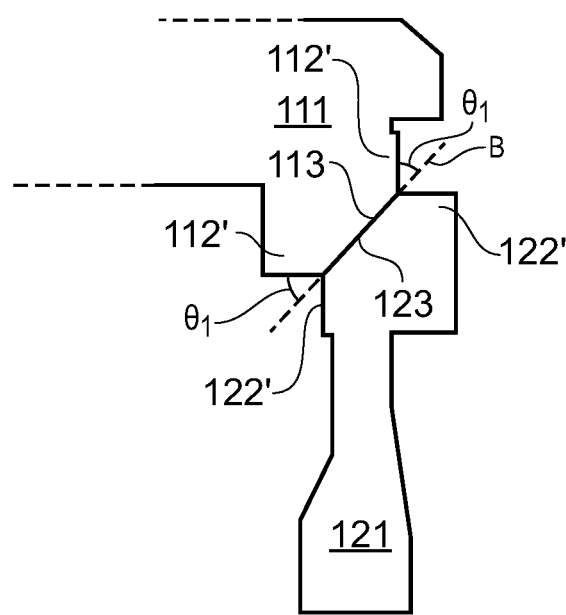
FIG. 7 shows schematically a longitudinal cross-section through aligned workpieces at initial weld surface contact in a fourth variant of the welding process.

FIG. 7 shows schematically a longitudinal cross-section through the aligned workpieces 111, 121 at initial weld surface contact in a fourth variant of the rotary friction welding process. In this case, the weld surfaces 113, 123 and their respective angled side surfaces mirror each other across the line B of the contacting weld surfaces on the longitudinal cross-section. Such an arrangement may be preferred, for example, when the workpieces are formed of the same material such that flash flow and expulsion of contaminants is largely the same at both workpieces, and/or when the weld surfaces are inclined by 45° from the radial direction.

In the fourth variant, each weld surface has the angle $\theta_1$ between one of its side surfaces and the weld surface being the same as the corresponding angle between the other of its side surfaces and the weld surface. Such an arrangement may be preferred, for example, in the case of a weld having a small ratio of outer diameter to inner diameter so that weld conditions are similar on both sides of the weld interface.

Those parts of the workpieces forming the side surfaces may be provided by portions of the workpieces which are not consumed by the welding process. For example, in the fourth variant the side portions 112' of the first weld surface 113 and the side portions 122' of the second weld surface 123 are not consumed. Conveniently, in this case, the side portions 112', 122' can be formed by build-up of a suitable material in a material addition process, and can be removed post-welding by machining.

In the fourth variant, deviation from exacting mirroring across the line B of the contacting weld surfaces on the longitudinal cross-section may be adopted in order to thermally match the weld surfaces and their side surfaces such the heat flows from the weld at all the side surfaces are substantially equal. Such deviation may be beneficial, for example, when the materials of the workpieces have different thermal properties and/or when the weld surfaces are inclined by angles other than 45° from the radial direction.

While the disclosure has been described in conjunction with the exemplary embodiments described above, many equivalent modifications and variations will be apparent to those skilled in the art when given this disclosure. For example, the process can be used to form other components, i.e. not just in the high-pressure compressor but also, for example, in the intermediate-pressure compressor and in the turbine section. Accordingly, the exemplary embodiments of the disclosure set forth above are considered to be illustrative and not limiting. Various changes to the described embodiments may be made without departing from the spirit and scope of the invention.

We claim:
1. A rotary friction welding process including:
providing an outer axisymmetric workpiece for machining into a rim portion of a rotor disc of a multi-stage rotor assembly of a gas turbine engine, the outer workpiece having a front first annular weld surface at a radially inward extent of the outer workpiece and a rear first annular weld surface at a radially inward extent of the outer workpiece;
providing a front inner axisymmetric workpiece for machining into a front diaphragm of the rotor disc, the front inner workpiece having a front second annular weld surface at a radially outward extent of the front inner workpiece;
providing a rear inner axisymmetric workpiece for machining into a rear diaphragm of the rotor disc, the rear inner workpiece having a rear second annular weld surface at a radially outward extent of the rear inner workpiece;
aligning the outer workpiece and the front inner workpiece on a common axis (X-X) with the front first and second weld surfaces facing each other, rotating one of the outer and front inner workpieces about the axis relative to the other aligned workpiece, engaging the aligned workpieces at the front first and second weld surfaces such that the rotation raises the temperature at the front weld surfaces to create a front weld interface, and ceasing the rotation and allowing the front weld interface to cool to weld the outer and the front inner workpieces together at the front interface; and
aligning the outer workpiece and the rear inner workpiece on the common axis with the rear first and second weld surfaces facing each other, rotating one of the outer and rear inner workpieces about the axis relative to the other aligned workpiece, engaging the aligned workpieces at the rear first and second weld surfaces such that the rotation raises the temperature at the rear weld surfaces to create a rear weld interface, and ceasing the rotation and allowing the rear weld interface to cool to weld the outer and the rear inner workpieces together at the rear interface;
wherein:
on a longitudinal section through the aligned workpieces, the front first and second annular weld surfaces are inclined from the radial direction and are substantially parallel to each other such that the cooled front weld interface is correspondingly inclined from the radial direction, and the rear first and second annular weld surfaces are inclined from the radial direction and are substantially parallel to each other such that the cooled rear weld interface is correspondingly inclined from the radial direction, and one of each pair of first and second annular weld surfaces is an apex region of a convexity which is consumed as the respective workpieces are engaged, on the longitudinal section through the aligned workpieces the convexity having a profile in which radially inner and outer side surfaces of the convexity taper towards the apex region such that, on the longitudinal section, the respective weld interface increases in length as the convexity is consumed.

2. A rotary friction welding process according to claim 1, wherein the outer workpiece has a further first annular weld surface at a radially inward extent thereof, and the process further includes:

providing a further inner axisymmetric workpiece for machining into a further diaphragm of the rotor disc, the further inner workpiece having a further second annular weld surface at a radially outward extent of the further inner workpiece; and aligning the outer workpiece and the further inner workpiece on a common axis with the further first and second weld surfaces facing each other, rotating one of the outer and further inner workpieces about the axis relative to the other aligned workpiece, engaging the aligned workpieces at the further first and second weld surfaces such that the rotation raises the temperature at the further weld surfaces to create a further weld interface, and ceasing the rotation and allowing the further weld interface to cool to weld the outer and the further inner workpieces together at the further interface;

wherein:

on the longitudinal section through the aligned workpieces, the further first and second annular weld surfaces are inclined from the radial direction and are substantially parallel to each other such that the cooled further weld interface is correspondingly inclined from the radial direction.

3. A rotary friction welding process according to claim 1, wherein, on the longitudinal section, the first and second weld surfaces of each pair of first and second weld surfaces is inclined by at least 25° and/or by at most 65° from the radial direction.

4. A rotary friction welding process according to claim 1, wherein the outer workpiece is formed of a different material to that of any one or more of the inner workpieces.

5. A rotary friction welding process including:

providing an outer axisymmetric workpiece for machining into a rim portion of a rotor disc of a multi-stage rotor assembly of a gas turbine engine, the outer workpiece having a front first annular weld surface at a radially inward extent of the outer workpiece and a rear first annular weld surface at a radially inward extent of the outer workpiece;

providing a front inner axisymmetric workpiece for machining into a front diaphragm of the rotor disc, the front inner workpiece having a front second annular weld surface at a radially outward extent of the front inner workpiece;

providing a rear inner axisymmetric workpiece for machining into a rear diaphragm of the rotor disc, the rear inner workpiece having a rear second annular weld surface at a radially outward extent of the rear inner workpiece;

aligning the outer workpiece and the front inner workpiece on a common axis (X-X) with the front first and second weld surfaces facing each other, rotating one of the outer and front inner workpieces about the axis relative to the other aligned workpiece, engaging the aligned workpieces at the front first and second weld surfaces such that the rotation raises the temperature at the front weld surfaces to create a front weld interface, and ceasing the rotation and allowing the front weld interface to cool to weld the outer and the front inner workpieces together at the front interface; and aligning the outer workpiece and the rear inner workpiece on the common axis with the rear first and second weld surfaces facing each other, rotating one of the outer and rear inner workpieces about the axis relative to the other aligned workpiece, engaging the aligned workpieces at the rear first and second weld surfaces such that the rotation raises the temperature at the rear weld surfaces to create a rear weld interface, and ceasing the rotation and allowing the rear weld interface to cool to weld the outer and the rear inner workpieces together at the rear interface;

wherein:

on a longitudinal section through the aligned workpieces, the front first and second annular weld surfaces are inclined from the radial direction and are substantially parallel to each other such that the cooled front weld interface is correspondingly inclined from the radial direction, and the rear first and second annular weld surfaces are inclined from the radial direction and are substantially parallel to each other such that the cooled rear weld interface is correspondingly inclined from the radial direction, and on the longitudinal section through the aligned workpieces, each weld surface of each pair of first and second weld surfaces may be flanked by radially inner and outer side surfaces which are angled from their respective weld surface, the first weld surface and its side surfaces being shaped to thermally match the second weld surface and its side surfaces across a line of initial contact of the first and second weld surfaces such the heat flows from the weld at all the side surfaces are substantially equal.

6. A rotary friction welding process according to claim 5, wherein on the longitudinal section through the aligned workpieces, the first weld surface and its side surfaces mirror the second weld surface and its side surfaces across the line of initial contact of the first and second weld surfaces.

7. A rotary friction welding process according to claim 1, wherein the other of the first and second annular weld surfaces of each pair of first and second annular weld surfaces is a further apex region of a further convexity, on the longitudinal section the further convexity having a profile in which radially inner and outer side surfaces of the further convexity taper towards the further apex region such that, on the longitudinal section, the weld interface increases in length as the further convexity is consumed.

8. A rotary friction welding process according to claim 5, wherein, on the longitudinal section, the side surfaces are angled by at least 5° and/or at most 80° from the respective weld surface.

9. A method of forming a rotor disc of a multi-stage rotor assembly of a gas turbine engine, method including:

performing the process of claim 1;

machining the outer workpiece into a rim portion of the rotor disc; and machining each inner workpiece into a respective diaphragm of the rotor disc.

10. A method of forming a multi-stage blisk assembly of a gas turbine engine, the method including:
    performing a rotary friction welding process including:
        providing an outer axisymmetric workpiece for machining into a rim portion of a rotor disc of a multi-stage rotor assembly of a gas turbine engine, the outer workpiece having a front first annular weld surface at a radially inward extent of the outer workpiece and a rear first annular weld surface at a radially inward extent of the outer workpiece;
        providing a front inner axisymmetric workpiece for machining into a front diaphragm of the rotor disc, the front inner workpiece having a front second annular weld surface at a radially outward extent of the front inner workpiece;
        providing a rear inner axisymmetric workpiece for machining into a rear diaphragm of the rotor disc, the rear inner workpiece having a rear second annular weld surface at a radially outward extent of the rear inner workpiece;
        aligning the outer workpiece and the front inner workpiece on a common axis (X-X) with the front first and second weld surfaces facing each other, rotating one of the outer and front inner workpieces about the axis relative to the other aligned workpiece, engaging the aligned workpieces at the front first and second weld surfaces such that the rotation raises the temperature at the front weld surfaces to create a front weld interface, and ceasing the rotation and allowing the front weld interface to cool to weld the outer and the front inner workpieces together at the front interface; and
        aligning the outer workpiece and the rear inner workpiece on the common axis with the rear first and second weld surfaces facing each other, rotating one of the outer and rear inner workpieces about the axis relative to the other aligned workpiece, engaging the aligned workpieces at the rear first and second weld surfaces such that the rotation raises the temperature at the rear weld surfaces to create a rear weld interface, and ceasing the rotation and allowing the rear weld interface to cool to weld the outer and the rear inner workpieces together at the rear interface;
        wherein on a longitudinal section through the aligned workpieces, the front first and second annular weld surfaces are inclined from the radial direction and are substantially parallel to each other such that the cooled front weld interface is correspondingly inclined from the radial direction, and the rear first and second annular weld surfaces are inclined from the radial direction and are substantially parallel to each other such that the cooled rear weld interface is correspondingly inclined from the radial direction;
    machining the outer workpiece into a rim portion of a rotor disc of the assembly and into two or more circumferential rows of aerofoil bodies extending from the rim portion; and
    machining each inner workpiece into a respective diaphragm of the rotor disc.

11. A method according to claim 9, wherein the outer workpiece and/or the inner workpieces include sacrificial material adjacent the weld surfaces to stiffen the workpieces and/or to facilitate the application of forge loads during engagement of the aligned workpieces in the rotary friction welding process, the method further including:
    machining away the sacrificial material.

* * * * *